United States Patent
Gilbert et al.

[11] Patent Number: 5,878,620
[45] Date of Patent: Mar. 9, 1999

[54] CONDUCTIVE FABRIC SENSOR FOR VEHICLE SEATS

[75] Inventors: Steven Charles Gilbert, Avon; Jay E. Boyce, Honeoye Falls, both of N.Y.

[73] Assignee: Schlege Systems, Inc., Rochester, N.Y.

[21] Appl. No.: 763,356

[22] Filed: Jan. 23, 1997

[51] Int. Cl.⁶ .................................................. G01M 19/00
[52] U.S. Cl. .......................... 73/172; 73/865.9; 280/735; 180/273
[58] Field of Search ............................ 73/862, 46, 865.9, 73/172; 340/665, 666, 667, 457.1; 200/85 A, 85 R; 280/735; 180/273; 324/661

[56] References Cited

U.S. PATENT DOCUMENTS

| | | | |
|---|---|---|---|
| 4,836,033 | 6/1989 | Seitz | 73/862.046 |
| 5,232,243 | 8/1993 | Blackburn | 280/735 |
| 5,305,017 | 4/1994 | Gerpheide . | |
| 5,431,064 | 7/1995 | Franz | 73/862.392 |
| 5,439,249 | 8/1995 | Steffens, Jr. et al. . | |
| 5,446,391 | 8/1995 | Aoki | 324/661 |
| 5,454,591 | 10/1995 | Mazur et al. . | |
| 5,468,014 | 11/1995 | Gimbel et al. . | |
| 5,474,327 | 12/1995 | Schousek . | |
| 5,481,078 | 1/1996 | Asche . | |
| 5,482,314 | 1/1996 | Corrado et al. . | |
| 5,528,698 | 6/1996 | Kamei et al. . | |
| 5,573,269 | 11/1996 | Gentry et al. . | |
| 5,585,779 | 12/1996 | Halikias . | |

Primary Examiner—Christine K. Oda
Attorney, Agent, or Firm—Cumpston & Shaw

[57] ABSTRACT

A sensor for the seat of a motor vehicle includes a compressible, preferably foam layer disposed between two conductive sheets. In one embodiment, the capacitance between the conductive sheets is measured to determine what and whether an object is disposed on the sensor, while in another application, apertures are formed through the compressible layer to allow the conductive sheets to contact one another through the apertures. One embodiment having relatively low resistivity to produce a short circuit, and another embodiment has higher resistivity in which the magnitude of the change and resistance may be used to determine the nature of an object.

10 Claims, 4 Drawing Sheets

CONDUCTIVE FABRIC SENSOR FOR VEHICLE SEATS

FIELD OF THE INVENTION

The present invention relates generally to sensor systems using conductive fabric, and more specifically to conductive fabric sensor systems that can operate either as a switch or weight sensor.

BACKGROUND OF THE INVENTION

There are many applications for weight sensors which can be used to facilitate a triggering system or attenuate a triggering system that is made operative automatically upon the occurrence of certain events. One such circumstance is the deployment of safety airbags from a vehicle interior. It has been widely reported that the force with which such airbags are deployed can cause injury to the very persons such bags are thought to protect. The force of deployment is especially detrimental to children and other small persons below a certain weight. A sensor used in combination with the airbag that could record, interpret and transmit signals to the airbag release mechanism related to the weight of the occupant currently in the car seat would be highly advantageous. In a sophisticated airbag release system, the rate and degree of inflation could be adjusted to occur in safe proportion to the weight of the seat occupant so as to reduce the degree of potential injury due to high velocity deployment.

BRIEF DESCRIPTION OF THE INVENTION

Briefly stated, and in accordance with a presently preferred embodiment of the invention, a sensor embedded in a vehicle seat for determining the nature of a person or object occupying the seat includes a layer of compressible material having a plurality of apertures extending therethrough from a first surface to a second surface of the layer, a first layer of conductive fabric on a first surface, a second layer of conductive fabric on a second surface, and a sensor connected to the first and second layers of conductive fabric for measuring the electrical resistance therebetween for determining the nature of a person or object occupying the seat.

In accordance with another aspect of the invention, the layer of conductive fabric is stretchable in one direction.

In accordance with still another aspect of the invention, a layer of conductive fabric is stretchable in two directions.

In accordance with a further aspect of the invention, one of the layers of conductive fabric has a higher resistivity measured in ohms per square than the other layer of conductive fabric, and a sensor is connected between spaced apart points on the higher resistivity layer of conductive fabric for measuring the resistance between the spaced apart points.

BRIEF DESCRIPTION OF THE DRAWINGS

While the novel aspects of the invention are set forth with particularity in the appended claims, the invention itself, together with other objects and advantages thereof may be more readily comprehended by reference to the following detailed description of a presently preferred embodiment thereof, taken in conjunction with the accompanying drawings, in which:

DESCRIPTION OF THE INVENTION

According to the present invention, the system can function either as a switch or as a weight sensor or both. The operating range and/or function of the sensor depends upon the way the materials are cut, adhered, or interconnected and upon the relative stability of the surrounding support structure.

Figure 1:
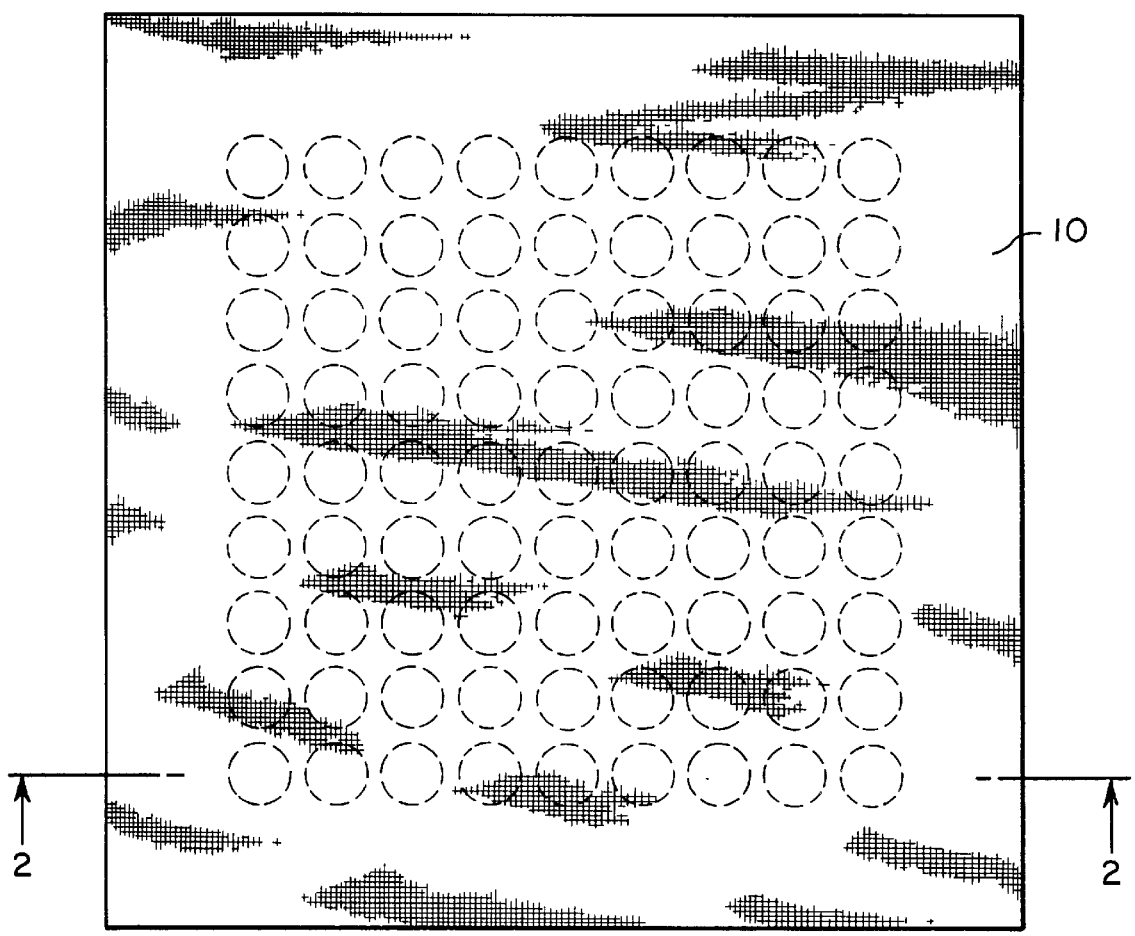
FIG. 1 is a top plan view of a seat sensor in accordance with a presently preferred embodiment of the invention.
Figure 2:
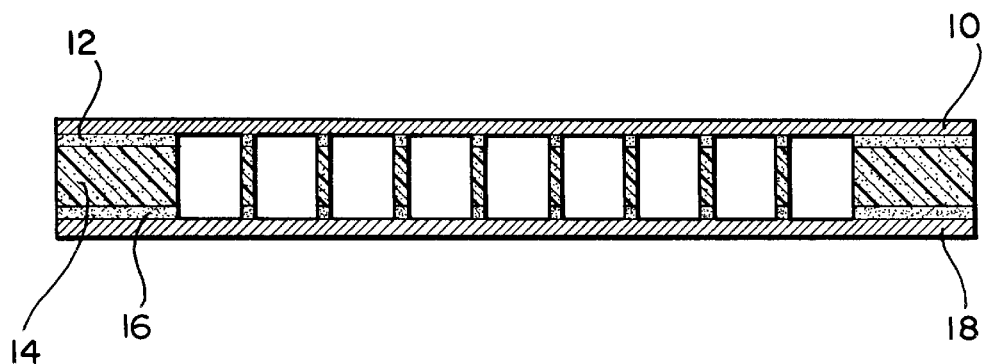
FIG. 2 is a section taken along lines 2—2 of FIG. 1.

As shown in FIGS. 1 and 2, the basic preferred construction of the sensor is a five-layer laminate although any suitable layered structure may be suitable. In the preferred five-layer system the basic construction comprises the following elements: a first layer of conductive fabric 10; a layer of adhesive 12; a layer of compressible foam 14; a layer of adhesive 16; and a second layer of conductive fabric 18.

The preferred fabric can be conductive throughout or conductive on one side only, and may be stretchy and flexible in one direction, both directions (x and y) or in neither direction. The conductivity must be matched to the properties of the other materials to produce a trigger or sensing in the desired range of weight. If the fabric is conductive on one side only, then that side must be against the foam.

Figure 3:
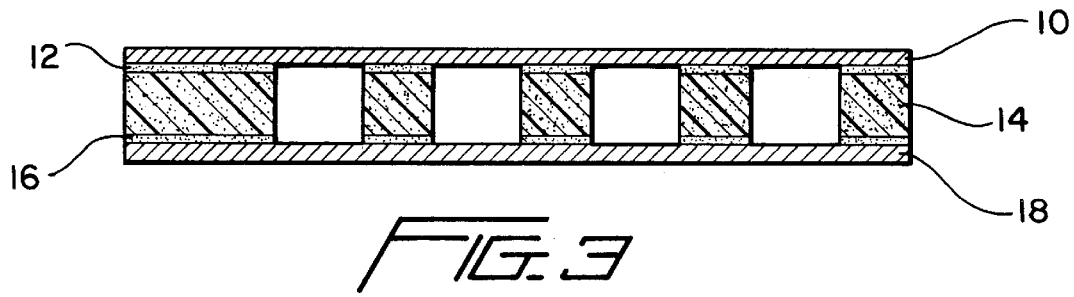
FIG. 3 is a section view of the sensor pad of the invention in an uncompressed state.

The preferred adhesive must be sufficiently strong to adhere the fabric to the foam throughout the life of the sensor or switch. The adhesive must be applied to the foam prior to any holes being cut, so that where there is a hole in the foam, there will be no adhesive on the fabric, as shown in FIGS. 2 and 3.

The preferred foam thickness, compression set and mechanical configuration preferably determine the functionality of the sensor. The foam must withstand repeated compression and flexing cycles as would naturally attend seat usage.

The preferred switch construction relies on the size and spacing of openings in the foam over the functional range. For instance, using an ester based foam having a thickness of about 0.25 in. thick 2 pound foam with approximately 0.40 in. diameter holes or pores spaced on about 0.1 in. centers might provide a triggering effect at about 50 pounds per square foot. Removing some of the holes, changing hole diameters, changing the spacing or changing the foam properties will produce a new trigger point in terms of weight distribution measured as pounds per square foot. The trigger point will also be affected and manipulated by altering the stiffness of the support structure.

Figure 4:
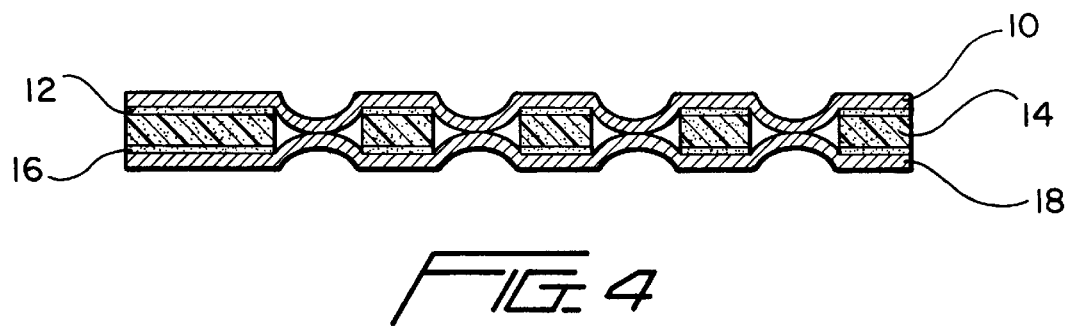
FIG. 4 is a section view of the sensor pad of the invention in a compressed state.

According to the present invention, as shown in FIG. 4 in one preferred embodiment, the switch operation relies on the flexibility of the conductive fabric and the compressibility of the foam. In operation, the foam 14 must compress somewhat, and the fabric 10, 18 must extend into the holes in the foam. At some point, the upper and lower fabric will touch, producing a conductive pathway. The switch relies on the flexibility of the support structure (both top and bottom) to push the fabric into the holes in the foam far enough to make contact between the two pieces of fabric. For instance, if the switch is placed on a firm table top, it will not work, because the lower fabric surface will never raise up through the holes in the foam to come in contact with the other fabric surface.

Figure 6:
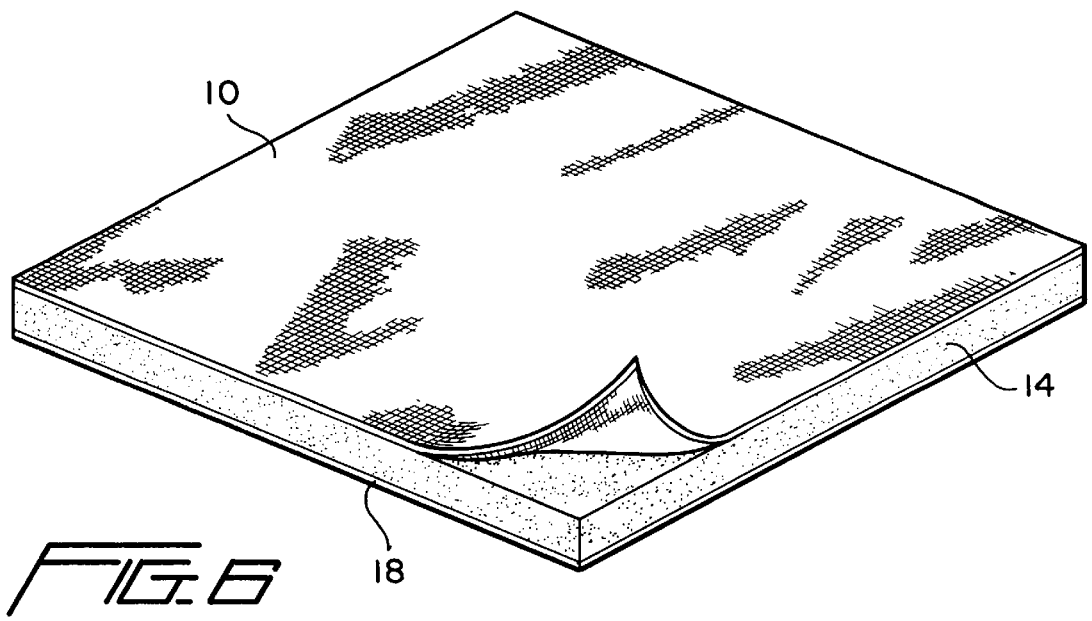
FIG. 6 is a diagrammatic view of an embodiment of the invention that relies on the capacitance change as a foam layer is compressed.
Figure 7:
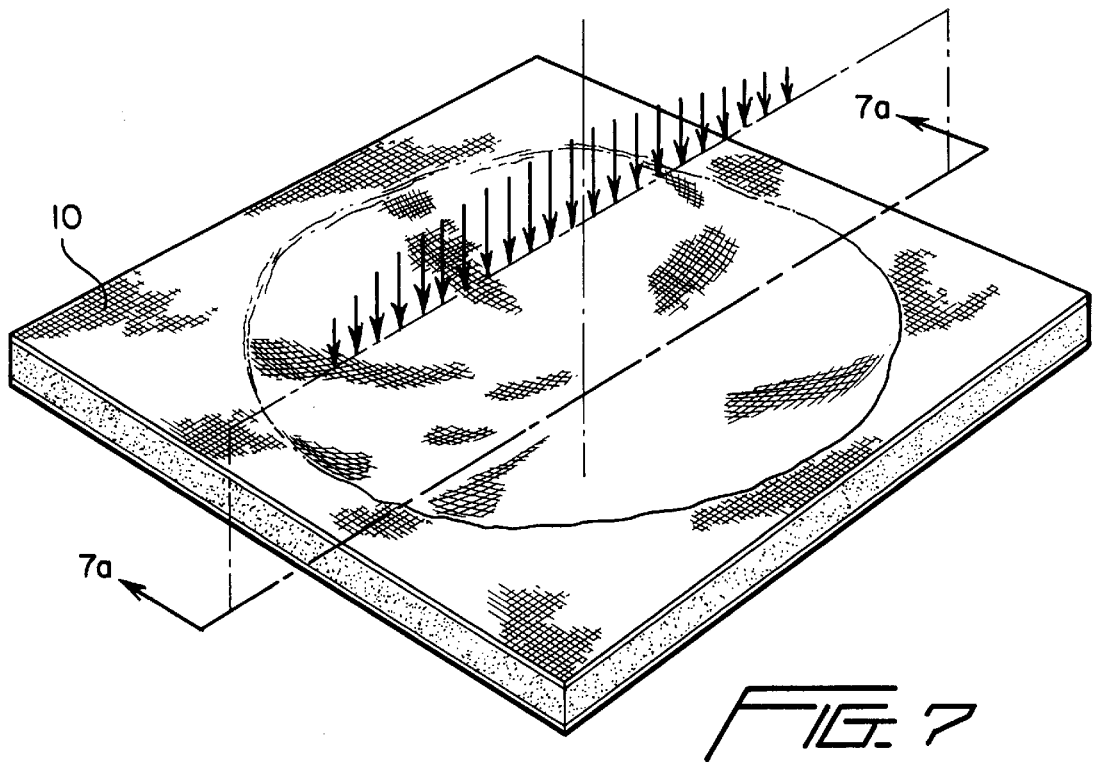
FIG. 7 is a view of the sensor pad of FIG. 6 with a weight being applied thereto.
Figure 7A:
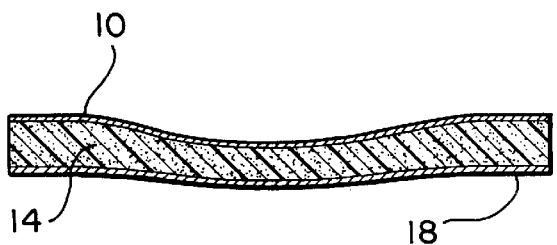

In one preferred embodiment, as shown in FIGS. 6 and 7, the construction of the sensor of the present invention relies on the capacitance effects of the fabric/foam laminate. As the two conductive layers 10, 18 are brought closer together by pressure, the distance between the fabric will change and the capacitance of the assembly can be measured. The capacitance value can be calibrated to provide a weight value. This assembly requires a continuous foam surface 14 with no holes, so that the two fabric surfaces cannot touch one another.

Figure 5:
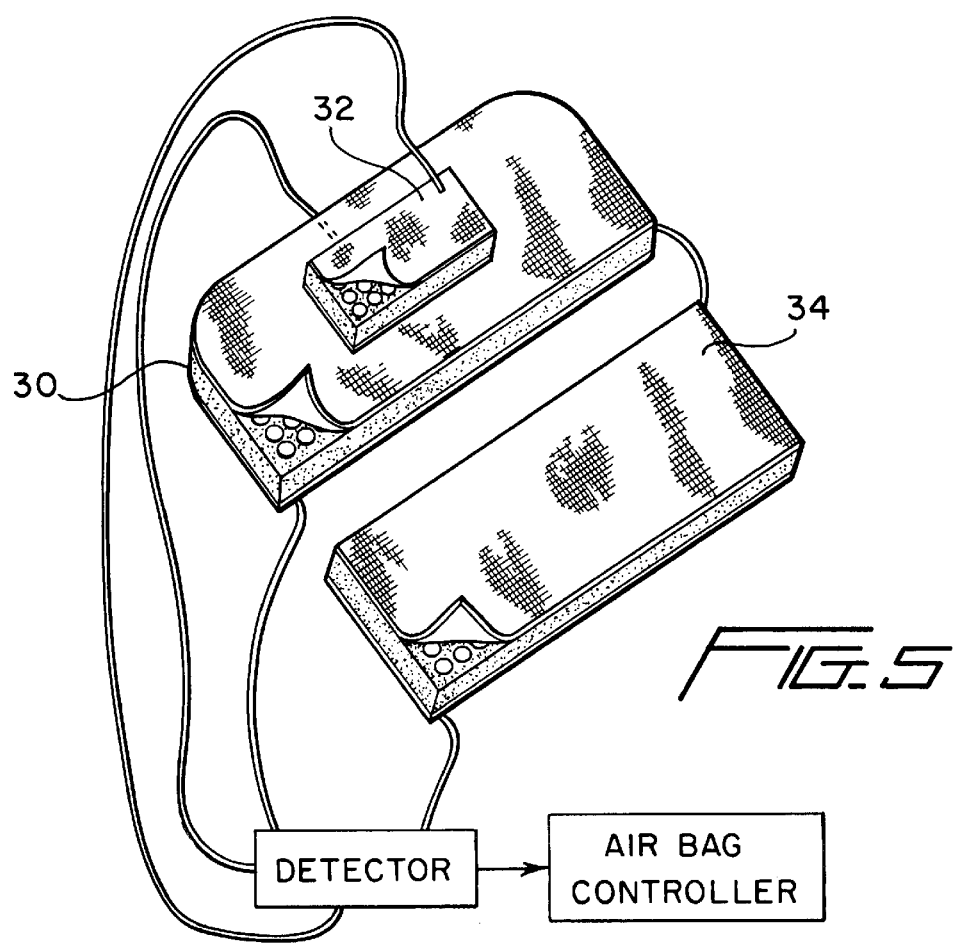
FIG. 5 is a diagrammatic view of a seat sensor system in accordance with the invention, including a plurality of sensor pads having different characteristics.

FIG. 5 shows an embodiment of the invention in which a plurality of sensors is provided on a vehicle seat for determining the nature of a package or a person occupying the seat. Each of the sensors 30, 32, and 34 is formed in any of the manners described in the application, and is positioned with respect to the seat, so as to be actuated by a person sitting on the seat or an object placed thereon. For example, the sensor 30 may be placed on the seat, the sensor 32 disposed in the center of the seat so that it would be actuated by a person sitting on the seat but not by a car seat whose rails would straddle sensor 32, and sensor 34 could be positioned on the seat back. In this way, by noting the signals produced or not produced by loads applied to the three sensors, the nature of the person or thing occupying the seat could be determined.

Figure 8:
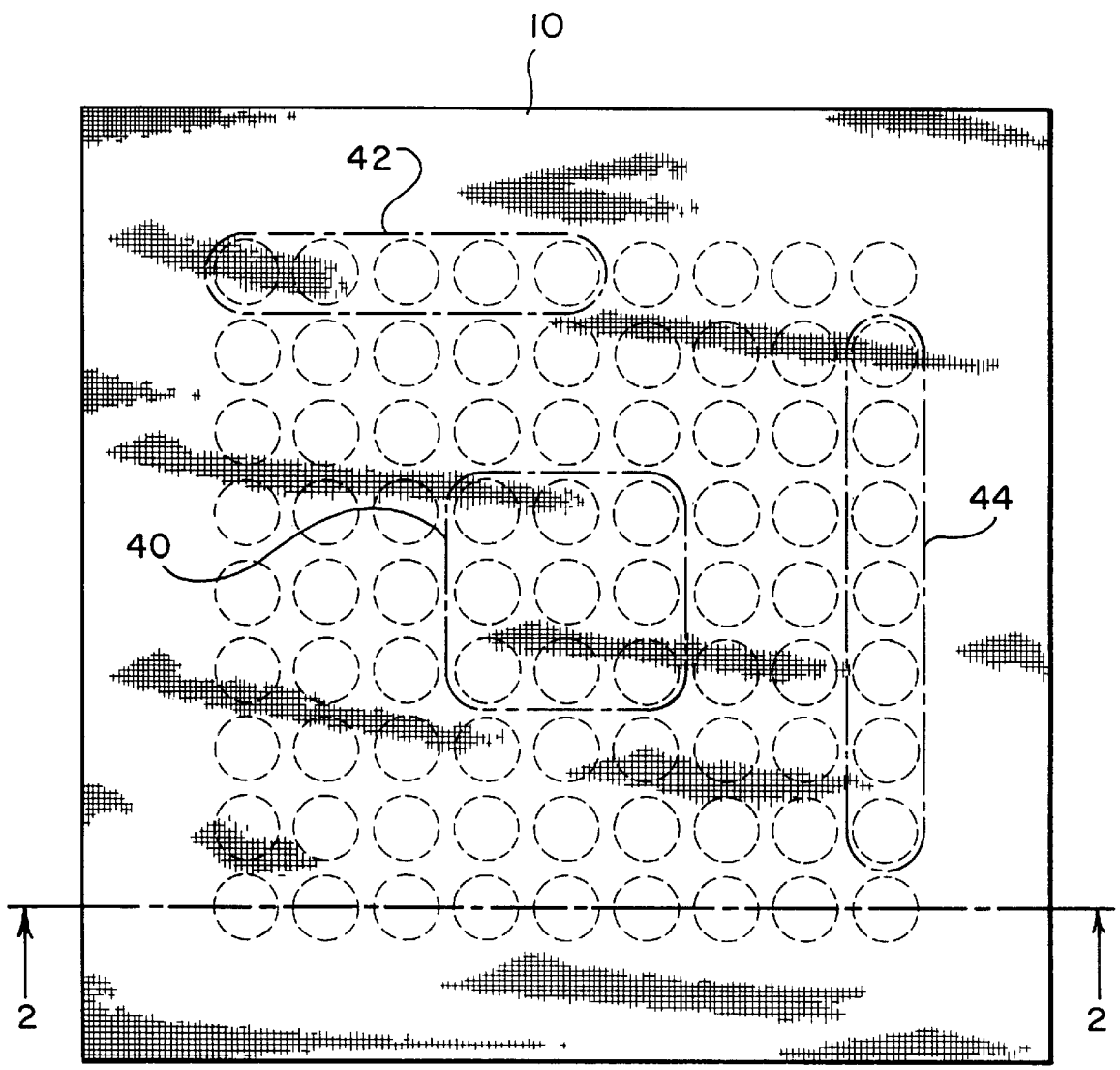
FIG. 8 is a plan view of an embodiment with localized shorting pads on one fabric layer.

FIG. 8 shows another embodiment of the invention. In this embodiment, the bottom fabric layer 18 is characterized by a measurable resistivity, such as 1–10 ohms per square, and the upper fabric layer 10 is selectively conductive, so that pressure must be applied in certain areas to create a short circuit between spaced apart locations on lower fabric area 18. This will allow the location of loads on the sensor to be determined without the need for a matrix of inputs and outputs. For example, a person occupying a seat would be expected to create pressure close to the center of the sensor, while a car seat having side rails would exert more pressure at the edges and less at the center. Center pad 40 covers a 3×3 array of squares, and even if short circuits were created covering all nine of the openings, only a relatively small change in resistance would take place. However, longer conductive pads 42 and 44 which cover a relatively smaller number of openings, but a longer distance would produce a greater change in resistance, which could readily be detected by known means.

What is claimed is:

1. A sensor embedded in a vehicle seat for determining the nature of a person or object occupying the seat comprising:

a layer of compressible material having a plurality of apertures extending therethrough, from a first surface to a second surface of the layer of compressible material;

a first layer of conductive fabric on the first surface;

a second layer of conductive fabric on the second surface;

a sensor connected to the first and second layers of conductive fabric for measuring the electrical resistance therebetween for determining the nature of a person or object occupying the seat.

2. The sensor of claim 1 in which the layer of conductive fabric is stretchable in one direction.

3. The sensor of claim 1 in which the layer of conductive fabric is stretchable in two directions.

4. The sensor of claim 1 in which the first layer of conductive fabric has a very low resistivity, measured in ohms per square.

5. The sensor of claim 1 in which the first layer of conductive fabric has a relatively high resistivity, measured in ohms per square.

6. The sensor of claim 1 in which the first layer of conductive material comprises a continuously conductive layer.

7. The sensor of claim 1 in which the first layer of conductive material comprises a locally conductive layer having conductive regions and non conductive regions.

8. A sensor embedded in a vehicle seat for determining the nature of a person or object occupying the seat comprising:

a layer of compressible material having a plurality of apertures extending therethrough, from a first surface to a second surface of the layer of compressible material;

a first layer of conductive fabric on the first surface having a first resistivity, close to zero;

a second layer of conductive fabric on the second surface having a higher resistivity than the first layer; and a sensor connected to spaced apart points on the second layer of conductive fabric for measuring the resistance between the points and producing a signal corresponding to the measured resistance for indicating the nature of a person or object occupying the seat.

9. The sensor of claim 8 in which the first layer of conductive fabric comprises a plurality of spaced apart conductive patches separated by low conductivity regions.

10. The sensor of claim 9 in which the plurality of conductive patches overlies at least two apertures in the layer of compressible material.

* * * * *

UNITED STATES PATENT AND TRADEMARK OFFICE
CERTIFICATE OF CORRECTION

PATENT NO. : 5,878,620
DATED : March 9, 1999
INVENTOR(S) : Gilbert et al.

It is certified that error appears in the above-indentified patent and that said Letters Patent is hereby corrected as shown below:

On the title page, item [73] should read:

Assignee: Schlegel Systems, Inc., Rochester, N.Y.

Signed and Sealed this

Twenty-first Day of September, 1999

Attest:

Q. TODD DICKINSON

Attesting Officer    Acting Commissioner of Patents and Trademarks